(12) United States Patent
Dye et al.

(10) Patent No.: US 12,630,312 B2
(45) Date of Patent: May 19, 2026

(54) ELECTRICALLY CONDUCTIVE SPACER FOR MULTILAYER INSULATION GROUNDING

(71) Applicant: Quest Thermal Group LLC, Arvada, CO (US)

(72) Inventors: Scott A. Dye, Morrison, CO (US); Phillip N. Tyler, Westminster, CO (US)

(73) Assignee: Quest Thermal Group LLC, Arvada, CO (US)

( * ) Notice: Subject to any disclaimer, the term of this patent is extended or adjusted under 35 U.S.C. 154(b) by 157 days.

(21) Appl. No.: 18/381,137

(22) Filed: Oct. 17, 2023

(65) Prior Publication Data

US 2024/0124164 A1    Apr. 18, 2024

Related U.S. Application Data

(60) Provisional application No. 63/416,709, filed on Oct. 17, 2022.

(51) Int. Cl.
B64G 1/58       (2006.01)
B64G 1/54       (2006.01)
H05F 3/02       (2006.01)

(52) U.S. Cl.
CPC .............. B64G 1/58 (2013.01); B64G 1/546 (2013.01); H05F 3/02 (2013.01)

(58) Field of Classification Search
CPC .............. B64G 1/58; B64G 1/546; H05F 3/02
See application file for complete search history.

(56) References Cited

U.S. PATENT DOCUMENTS

| | | | | |
|---|---|---|---|---|
| 10,753,527 | B1 * | 8/2020 | Dye | ...................... F16L 59/168 |
| 11,174,846 | B2 * | 11/2021 | Martin | ............... B32B 38/1808 |
| 2012/0175467 | A1 * | 7/2012 | Dye | ......................... B64G 1/50 |
| | | | | 244/171.7 |
| 2013/0141832 | A1 * | 6/2013 | Fellinger | ................... H05F 3/02 |
| | | | | 361/220 |
| 2015/0048209 | A1 * | 2/2015 | Hoyt | ........................ B64G 1/58 |
| | | | | 264/308 |

* cited by examiner

*Primary Examiner* — Travis M Figg

(74) *Attorney, Agent, or Firm* — Polsinelli PC; Gregory P. Durbin

(57)                ABSTRACT

As spacecraft electronic control and human support systems get increasingly sophisticated, protection for those systems becomes more critical. Multilayer insulation (MLI) is a common thermal protection system on spacecraft, and it includes layers of metalized film that may build up electrostatic charge that can be hazardous in many respects. MLI should be electrically grounded to prevent the unwanted electrostatic buildup while meeting thermal performance requirements. Aspects of the present disclosure involve a significant improvement in grounding methods within a multilayer insulation structure with minimal thermal performance degradation. Metalized spacers create electrical continuity through layers and may have only a single layer connecting to chassis ground. Multiple spacers can be utilized for larger blankets for grounding redundancy. Thermal performance penalty can be orders of magnitude smaller than conventional techniques.

15 Claims, 6 Drawing Sheets

ELECTRICALLY CONDUCTIVE SPACER FOR MULTILAYER INSULATION GROUNDING

CROSS-REFERENCE TO RELATED APPLICATION

This application is related to and claims priority under 35 U.S.C. § 119(e) from U.S. Patent Application No. 63/416, 709, filed Oct. 17, 2022, titled "ELECTRICALLY CONDUCTIVE SPACER FOR MULTILAYER INSULATION GROUNDING," the entire contents of which is incorporated herein by reference for all purposes.

TECHNICAL FIELD

The present invention relates generally to thermal multilayer insulation (MLI). More specifically, aspects of the present disclosure relate to electrical grounding of thermal insulation systems to prevent harmful electrostatic discharge from damaging sensitive electronic instruments used in aerospace, scientific and commercial applications.

BACKGROUND and INTRODUCTION

Lightweight, high performance thermal insulation is critical to next generation spacecraft and missions. Zero or low cryogenic propellant boiloff is required during extended or deep space missions and lengthy on-orbit times. Multilayer insulation (MLI) has been the insulation of choice for spacecraft and cryotank insulation for many years. MLI's high vacuum performance exceeds alternative insulations by a factor of ten. Traditional multilayer insulation technology is over 50 years old and is based on gold or aluminum metalized polymer films separated by polyester or silk netting. The metalized films are thermal radiation barriers and the netting reduces solid heat conduction. Improvements have been made in recent years by replacing the netting between layers with very low thermally conductive spacers resulting in a 50% reduction in heat flux per layer. However, heat flow through MLI is often the largest heat leak in cryogenic systems, so continual improvements in thermal performance are desirable.

Many spacecraft carrying sensitive electronics, controls and instruments are required to operate in orbits where the presence of plasma (ionized gas) presents a medium for surface and differential charging to occur. Low Earth, geo-synchronous and high inclination orbits as well as orbits around Jupiter and Saturn can result in significant buildup of electrostatic charge on the surface or within a multilayer insulation blanket. Static discharges of any type can interfere with payload operation or damage key electrical or electronic components, possibly resulting in total loss of the spacecraft.

In order to prevent or dissipate damaging electrostatic buildup or differential electrical potential, multilayer insulation blankets need to be grounded to the spacecraft structure. Blankets are grounded to the spacecraft through grounding straps (ground tails) that must meet specific mission grounding requirements while maintaining thermal performance requirements. The resistance from any ground tail to chassis ground typically must be <1Ω and the resistance from any metalized surface of the blanket to chassis ground <5000Ω. Though blankets <1 m² (10.8 ft²) in area may not require grounding, any applications with sensitive control systems do require grounding. Two grounds must be provided for each blanket assembly >1 m² (10.8 ft²) in area, with additional grounds for blankets larger than 4 m² (43.2 ft²) in area.

For traditional multilayer structures, ground tail(s) result in significant direct thermal shorts through the blanket, adding heat flux and degrading the thermal performance. Ground tails add mass, and additional layers may be required to meet thermal performance requirements which add further mass to the blanket structure.

It is with these observations in mind, among others, that aspects of the present disclosure were conceived.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed towards additional improvements.

Embodiments of the present disclosure involve an electrically conductive spacer placed between radiation barriers in an integrated multilayer insulation structure. Unlike conventional spacers, the spacer structure has been encapsulated with a thin metal surface (in one example, approximately 350-1500 angstroms thick) with an electrically conductive metal such as Aluminum, Nickel, Silver, Gold, Chromium, or Titanium. The metallization of the spacer may be applied through typical methods such as Physical Vapor Deposition (PVD), Chemical Vapor Deposition, or other techniques. The base material of the spacer is made of a low thermal conductivity material such as a polyehermide (e.g., ULTEM), Polyether ether ketone (PEEK), various liquid crystal polymers (LCPs) or Alumina that is compatible with the PVD or other process. The spacer geometry minimizes the cross-sectional area to length ratio (A/L) and solid thermal conduction through the spacer element. The thin metal coating provides electrical continuity across the spacer surfaces.

The radiation barriers use low surface emissivity materials such as dual metalized polymer films, or metallic materials. Generally, the radiant barriers are dual metalized polymer films such as polyethylene terephthalate (PET) or polyimide file (e.g., KAPTON) for mass production. Both the top and bottom surface of the polymer film are metalized with the polymer acting as an electrical insulator in between. The low emissivity surfaces of the dual metalized films reduce the radiative heat transfer through an integrated multilayer insulation structure. The layers are separated by a series of low thermally conductive spacers. The spacers may be attached to the radiant barrier layers with a non-conductive adhesive.

In order to provide an electrical ground path through the multilayer structure, individual stack(s) of electrically conductive spacers of the present disclosure may be used in place of one or more of the non-conductive spacer stacks. Generally, the multilayer structure includes at least one set of conductive spacers to provide a ground path. A conductive stack of discrete spacers may also be integrated into a conventional netting-separator MLI to provide a ground path. These conductive spacers are attached with an electrically conductive adhesive such as epoxy that has been nickel or silver filled. The conductive spacers may be aligned with a small hole in the adjacent radiant barrier. Using conductive adhesive, electrically conductive spacers may be bonded to a radiant barrier at any discrete locations aligned with the small hole through the radiant barrier. During the layering process conductive adhesive is applied to the top surface of the electrically conductive spacers and as the adjacent layer is positioned on top of the spacers, conductive adhesive expresses through the hole making electrical continuity across the metalized film. As an alternative method and structure, a small piece of conductive metal tape can wrap the edge of each radiant barrier, or a small amount of conductive epoxy placed on the edge of each layer, to make electrical continuity across the film without or in addition to holes through the layers.

For any multilayer insulation structure, electrically conductive spacer stacks of the present disclosure can be selectively placed to create electrical ground paths through the entire blanket (e.g., across the layers of the blanket). As the size of the blanket increases any number of stacks may be integrated into the multilayer insulation structure to provide sufficient grounding to prevent potentially damaging electrostatic buildup through the insulation structure. Additionally, some number of electrically conductive stacks throughout a multilayer structure provide redundant ground paths to increase fault tolerance.

The electrically conductive spacer of the present disclosure may also provide grounding paths distributed throughout all layers of an integrated multilayer insulation. With each layer electrically continuous by way of discrete spacers of the stack electrically interconnecting adjacent layers only one layer requires a chassis ground. A ground tail can be extended from any single layer within the multilayer structure not only simplifying the chassis ground but also preventing additional heat leak to the structure or cryotank being insulated due to layer shorting. Connecting the ground tail to a chassis ground prevents unwanted electrostatic buildup not only on the outer surface but through every layer of a multilayer insulation structure by way of the electrically conductive spacers.

One aspect of the present disclosure involves a multilayer insulation including a first insulation layer, which may be considered a radiant barrier, and a second insulation layer, which may also be considered a radiant barrier, and a structural spacer structure positioned between the first layer and the second layer, where the structural spacer structure includes a metalized outer surface with defined features and geometries to minimize solid thermal conductivity and provide electrical continuity between the first layer and the second layer.

In one example, the geometry of the spacer defines an A/L ratio of $1.36 \times 10^{-4}$ m to reduce conducted heat flux and an electrical resistivity of 0.1 to $2.0\Omega$ to reduce electrical continuity between the first layer and the second layer of the multilayer insulation.

In another example, the structural spacer structure is encapsulated with a layer of electrically conductive metal in the range of 350-1500 Angstroms and wherein the electrically conductive metal is Aluminum, Nickel, Silver, Gold, Chromium, or Titanium.

In various examples, the structural spacer structure comprises a low thermal conductivity material such as UITEM, PEEK, LCP or Alumina.

The structural spacer structure may be attached to the first layer through bonding with an electrically conductive adhesive that provides an electrical ground path through the metalized surface of the structural support spacer to the first layer.

It should be recognized that a multilayer insulation structure of the present disclosure may include one or more stacks of metalized structural supports providing ground paths between the layers of the structure. ort spacer positioned between the second layer and a third layer of the multilayer insulation.

DETAILED DESCRIPTION

Aspects of the present disclosure are directed to a metalized structural spacer as an integral part of a multilayer insulation system used in high vacuum applications such as spacecraft, laboratory or commercial applications. Electrically conductive grounding spacers of the present disclosure result in direct grounding through the insulation layers out to a single layer ground tail, in one example. This results in more efficient and redundant electrical grounding while minimizing direct thermal shorting of the radiant barrier layers, reducing heat flux and reducing overall system mass.

Embodiments of the present disclosure solve a number of the shortcomings in the prior state of the art methods for electrically grounding insulation blankets used in aerospace and commercial applications. Significant reductions in thermal performance penalties from grounding can be realized. For small blankets (e.g., <0.25 $m^2$) insulating sensitive instruments, tanks or control systems, typical electrical multilayer grounding can increase heat flux through the blanket by 6.9% for a 20 layer structure; whereas grounding through electrically conductive spacers of the present disclosure reduces that to 0.19%. For larger traditional MLI blankets (e.g., >1 $m^2$) multiple ground tails are required and heat flux with traditional grounding can increase by 49% for a common 60 layer structure; whereas grounding a similar blanket through electrically conductive spacers of the present invention reduces that to 0.048%, for a one thousand fold lower heat penalty.

Figure 1:
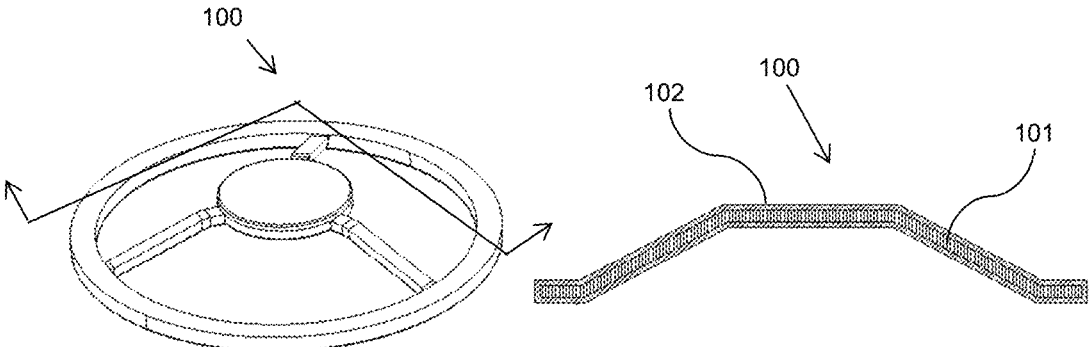
FIG. 1. Illustrates a metalized spacer in accordance with various embodiments of the present invention.

One embodiment of a structural spacer is depicted in FIG. 1. The spacer structure 100 is intended to create electrical ground paths through the insulation structure while minimizing the thermal performance degradation. The base material 101 of the spacer reduces solid thermal conduction by using low thermally conductive materials such as Ultem, PEEK, LCP, alumina or similar. The spacer base material is then metalized to produce a very thin metal coating 102 over the entire surface shown in cross section creating an electrically conductive path along the spacer height. As depicted in FIG. 1, one example of the spacer 100 minimizes an effective area to length (A/L) ratio of the solid conductive path from the bottom ring to the top disc. The spacer as illustrated has a leg length of $3.79 \times 10^{-4}$ m and a cross sectional area of $1.72 \times 10^{-7}$ m$^2$ for an A/L ratio of $1.36 \times 10^{-4}$ m. The spacer geometry as illustrated in FIG. 1 should be taken as exemplary in shape and not limiting. The spacer could take on many other shapes that minimize the solid conductive path across the height of the spacer by reducing the A/L ratio.

Figure 2:
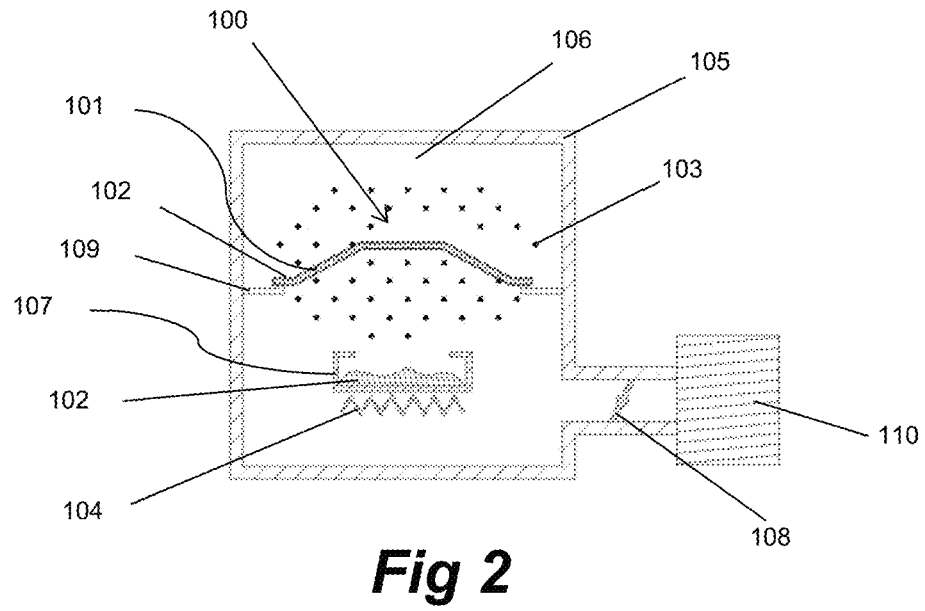
FIG. 2. Illustrates various methods of applying the metalized coating to a spacer.

An example of a physical or chemical vapor deposition metalizing process is depicted in FIG. 2. A thin metal coating 102 is created on the entire surface of the base material 101 producing metalized spacers 100. Base material spacers 101 are placed within a vacuum chamber 105 on small supports 109 that assure continuous coverage of the metallization on the spacer 100. The base metal material 102 such as aluminum, silver, nickel, chrome, gold, platinum, and titanium is placed within a crucible 107. Using a vacuum pump 110 the vacuum space 106 is evacuated to and sealed off with a valve 108 maintaining a high vacuum (e.g., $<10^{-5}$ torr) to eliminate substantially all gas particles. Using a heating element 104 the base material is vaporized into particles 103 which then condense on the surface of the spacer base material 101. The result is a metalized spacer 100 with a metal coating on the order of 350-1500 Angstroms thick on the entirety of the surfaces. This thin metal surface is sufficient to provide electrical continuity across the entire spacer with resistivity on the order of 0.1-2.0Ω depending on metal type and thickness.

Figure 3:
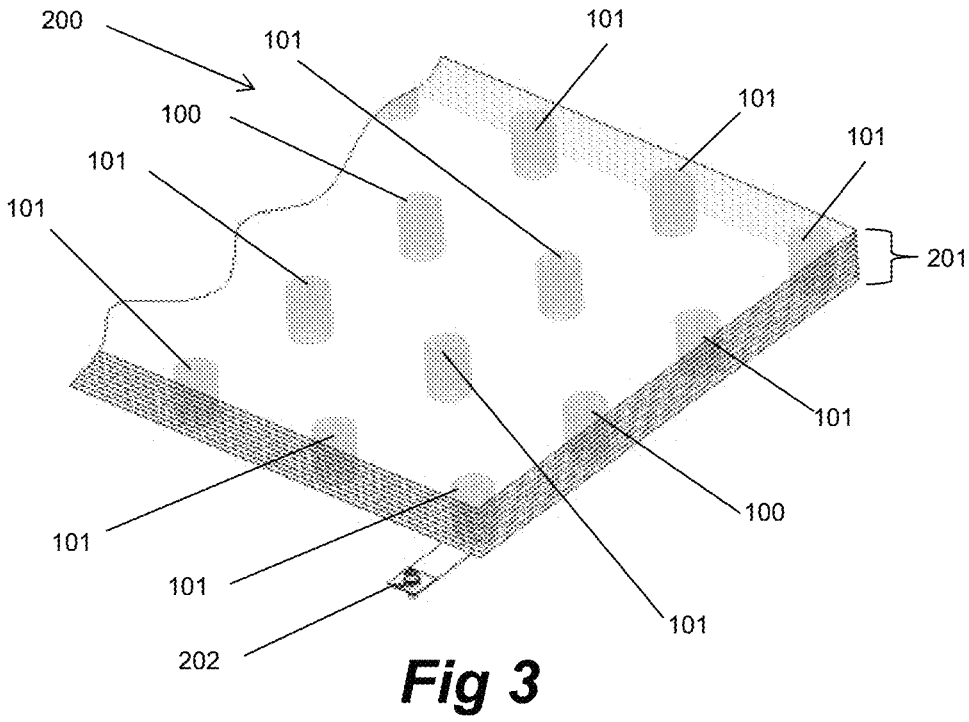
FIG. 3. Illustrates an integrated multilayer insulation with selective metalized spacer stacks creating electrical ground paths through the insulation structure, in accordance with one embodiment.

Depicted in FIG. 3 is one example of an integrated multilayer insulation structure 200 showing the multiple radiant barriers 201 and non-conductive spacers 101 placed between radiant barriers 201 at some grid spacing providing the necessary separation to maintain separation of the radiant barriers and minimal thermal conductive path across the multitude of layers. Metalized spacers 100 are selectively placed between the radiant barriers 201 creating electrically conductive path(s) across the multitude of layers. While 2 of the 9 spacer sets are metalized spacers, other ratios and numbers of metalized spacers are possible in any given implementation. In some examples, only one stack of metalized spacers may be sufficient. With an electrically conductive path though all layers via the metalized spacers 100, a ground tail 202 is required on only one layer (shown as bottom layer) to which at least one of the metalized spacers in a stack is conductively coupled. This ground tail is then grounded to the spacecraft or whatever supporting hardware. This method minimizes thermal shorting across the integrated multilayer insulation blanket and associated thermal performance penalty.

Figure 4:
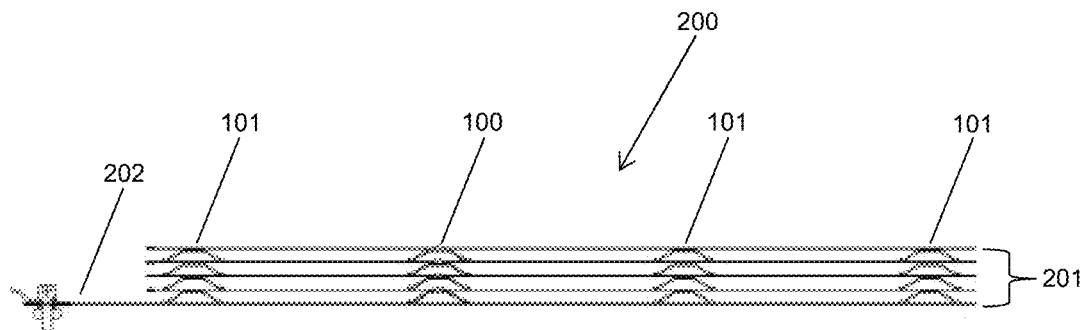
FIG. 4. Illustrates an integrated multilayer insulation in cross section showing both metalized and non-metalized spacer stacks and a ground tail, in accordance with one embodiment.

The integrated multilayer insulation structure 200 is shown in cross section in FIG. 4. The image illustrates various components of the integrated multilayer insulation including a stack of non-conductive spacers 101, the various layers 201 of the structure, the metalized spacer stack 100 and a ground tail 202 of one embodiment of the present disclosure.

Figure 5:
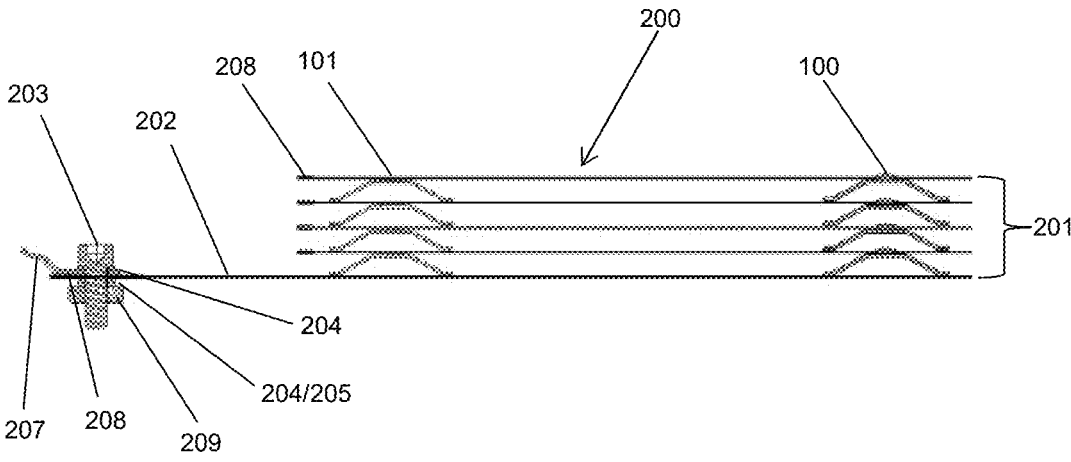
FIG. 5. Illustrates details of the cross section of FIG. 4.

Additional details of the integrated multilayer insulation structure 200 are shown in FIG. 5. Specifically, details with regard to the ground tail 202 and associated grounding hardware. The ground tail 202 is an extension of one of the radiant barrier layers 201 shown, in one example, as the bottom layer in the structure 200. Copper tape 208 may be wrapped at the edges of each layer and at the end of the tail to create an electrical ground path across the two opposing metalized surfaces of the radiant barrier film as well as provide sufficient rigidity and durability required to support the grounding hardware. A hole is punched through the copper tape 208 and ground tail 202. A grounding assembly may involve a small bolt 203, passing through a flat washer 204, an eyelet terminal 205, the ground tail 202/208, another flat washer 204, a lock washer 205, and a lock nut 209. A wire of the required length 207, such as 22-gauge Teflon-insulated wire, is crimped to the eyelet terminal and attached to the spacecraft chassis ground. Alternatively, the bolt 203 and ground tail 202/208 can be attached directly to the spacecraft chassis ground or the tail could be bonded to the underlying structure with conductive adhesive to eliminate the hardware altogether.

Figure 6:
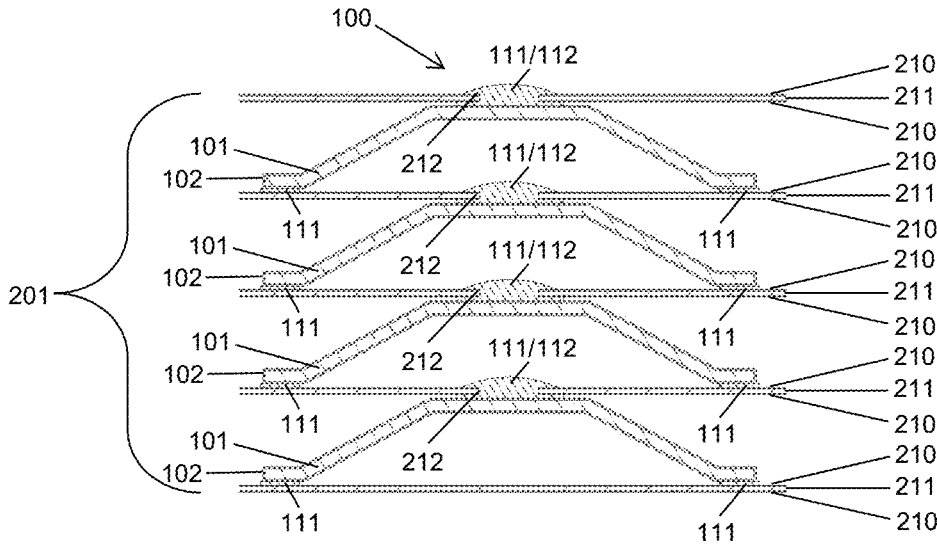
FIG. 6. Illustrates the grounded spacer stack in accordance with embodiments of the present disclosure, the spacer stack creating an electrical ground path through the multilayer insulation structure.

Details of one example of a grounding spacer stack are illustrated in FIG. 6. Metalized spacers 100 are positioned between each of the radiant barrier layers 201. The spacers 100 may be secured to each of the adjacent radiant barriers 201 using electrically conductive adhesive 111. The radiant barriers 211 are a typical dual metalized film such as Kapton, PET with a thin metal coating on both sides 210 readily available from film manufacturers such as Dunmore or Sheldahl. In order to provide electrical continuity across the top and the bottom metalized surfaces 210 of the radiant barrier 201, the spacers 100 are bonded to the metalized film surface 210 with conductive adhesive 111 and located with the top surface aligned with a hole 212 through the radiant barrier 201. The conductive adhesive 111 expresses through the hole 212 and creates a bulbous shape 112 on top of the radiant barrier 201 creating the electrically conductive path through each of the radiant barriers 201 and spacers 100 to the ground tail assembly. The resulting spacer stack 100 in FIG. 6 reduces solid heat conduction from layer to layer through the base material of the spacer 101 while providing electrical continuity through the entire insulation structure via the metalized surfaces 102.

Figures 7, 8:
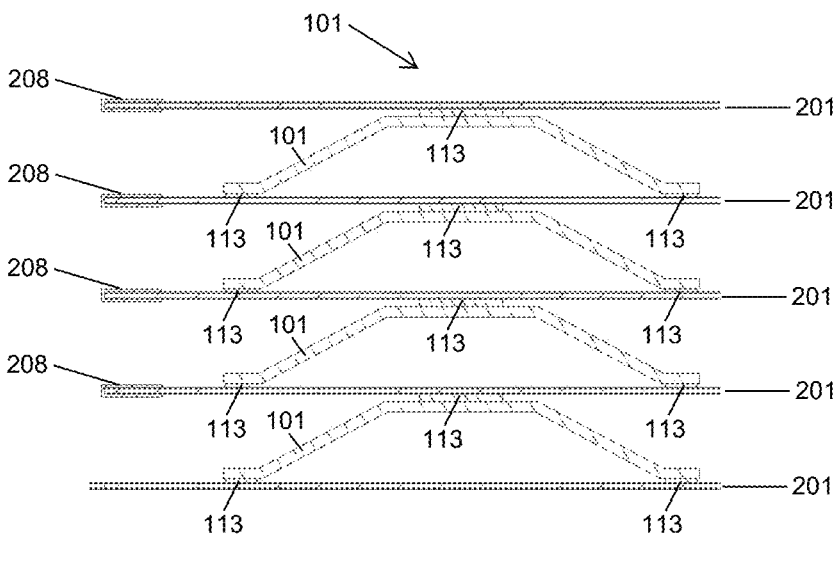
FIG. 7. Illustrates details of a non-metalized spacer stack within a multilayer insulation structure including edge conductors that provide a conductive path across any particular layer, which multilayer insulation structure may also include metalized conductive spacers arranged similarly to the non-metalized spacers shown.
FIG. 8. Illustrates a multilayer insulation with a ground tail.

As an alternative method of creating electrical continuity across the radiant barrier 201, a small piece of metal tape with conductive adhesive 208 can be wrapped around the edge of the radiant barrier 201 as shown in FIG. 7. This alleviates the need to accurately position the spacers 100 with a hole 212 (from FIG. 6) in the radiant barriers 201.

Details of one example of a nonconductive spacer stack in an integrated multilayer insulation structure are illustrated in FIG. 7. Nonmetallic spacers 101 are placed between each of the radiant barriers 201 and provide the interlayer spacing with low thermal conductivity. The spacers 101 may be secured to each of the radiant barrier 201 with a nonconductive, low outgassing adhesive 113.

In one example, while not shown in FIG. 7, a conductive spacer stack may also be used in the integrated multilayer insulation structure shown in FIG. 7. The conductive spacer stack may be positioned between layers like shown with the non-conductive spacer stack of FIG. 7, and as noted above, electrical continuity across layers and between radiant barriers is provided by the metal tape at the edges of the respective radiant barriers.

A netting separator multilayer insulation blanket 300 is illustrated in FIG. 8. The blanket includes alternating radiant barriers 201 with nonconductive netting materials 301 such as Dacron. A ground tail assembly 302 provides the necessary ground path to the spacecraft, cryotank, or other structure. The ground tail 302 is an extension of all the radiant barrier layers 201. Grounding the blanket 300 alleviates buildup of electrostatic charge through the insulation blanket.

Figure 9:
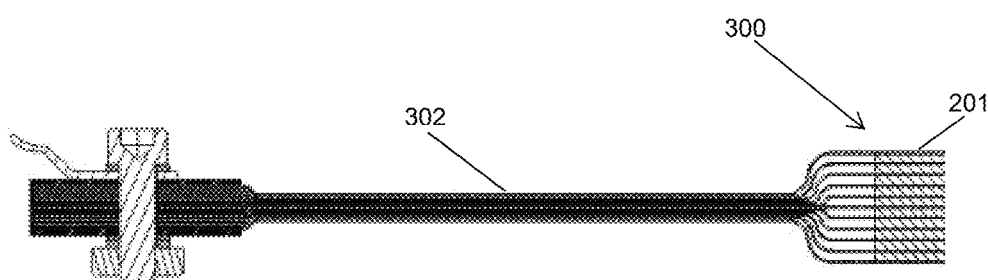
FIG. 9. Illustrates in cross section details of a grounding of a multilayer insulation structure.
Figure 10:
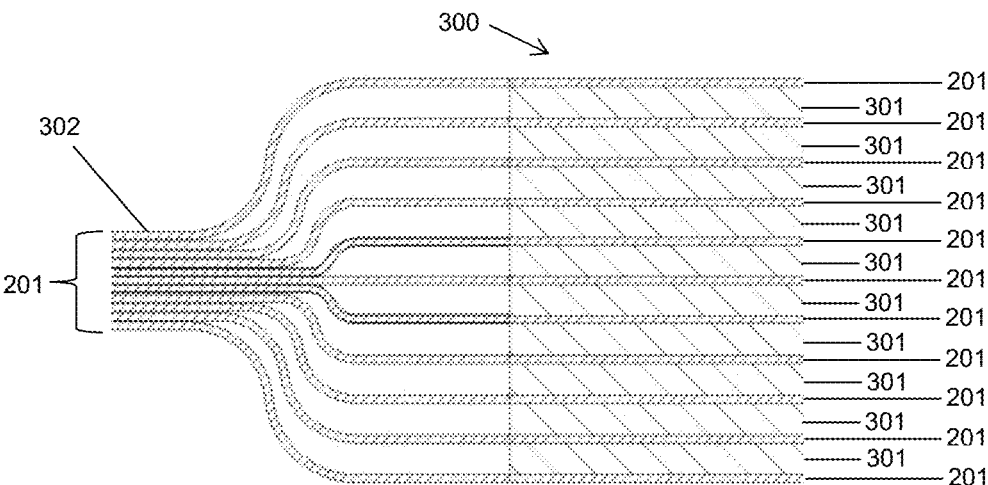
FIG. 10. Illustrates details of the ground tail of a multilayer insulation structure.
Figure 11:
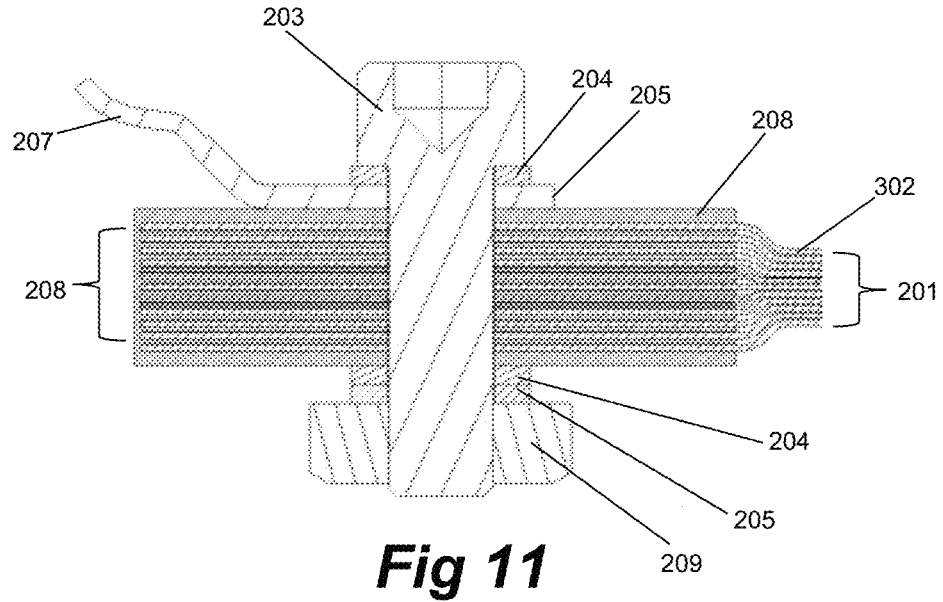
FIG. 11. Illustrates details of the shorted layers of a multilayer insulation structure.

A cross section of a ground tail assembly 302 is shown in FIG. 9 and further detailed in FIG. 10 and FIG. 11. In this arrangement, each of the radiant barriers 201 are gathered together in order to ground the entire blanket 300. The radiant barriers 201 of all layers are gathered into a stack and secured together creating the tail assembly 302. Details of gathering of layers are shown in FIG. 10. In order to ground the entire blanket 300, the nonconductive netting 301 is trimmed back to allow grounding of all of the radiant barriers 201. This gathering of layers creates thermal shorting of all of radiant barriers 201 along the tail length, thus degrading the thermal performance. A detail of termination of the ground tail is illustrated in FIG. 11. The ground tail 302 is an extension of all of the radiant barrier layers in the structure 300. Copper tape with conductive adhesive 208 is wrapped at the end of each layer of the tail to create an electrical ground path across the two opposing metalized surfaces of each radiant barrier 201 as well as provide sufficient rigidity and durability required to support the grounding hardware. Once each individual layer is wrapped, the entire stack is wrapped with an additional layer of copper tape 208. A hole is punched through the copper tape 208 and ground tail 302. A grounding assembly here involves a small bolt 203 passing through a flat washer 204, an eyelet terminal 205, the ground tail 201/208, another flat washer 204, a lock washer 205, and a lock nut 209. A wire of the required length 207, such as 22-gauge Teflon-insulated wire, is crimped to the eyelet terminal and attached to the spacecraft chassis ground. Alternatively, the bolt 203 and ground tail 302/208 can be attached directly to the spacecraft chassis ground.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present disclosure.

While specific embodiments are discussed, it should be understood that this is done for illustration purposes only. A person skilled in the relevant art will recognize that other components and configurations may be used without parting from the spirit and scope of the disclosure. Thus, the above description and drawings are illustrative and are not to be construed as limiting. Numerous specific details are described to provide a thorough understanding of the disclosure. However, in certain instances, well-known or conventional details are not described in order to avoid obscuring the description.

Reference to "one embodiment" or "an embodiment" means that a particular feature, structure, or characteristic described in connection with the embodiment is included in at least one embodiment of the disclosure. The appearances of the phrase "in one embodiment", or similarly and synonymously "in one example" or "in one instance", in various places in the specification are not necessarily all referring to the same embodiment, nor are separate or alternative embodiments mutually exclusive of other embodiments. Moreover, various features are described which may be exhibited by some embodiments and not by others. The disclosure is not limited to various embodiments (examples, instances or aspects) given in this specification. Various modifications and additions can be made to the exemplary embodiments discussed without departing from the scope of the present invention. Accordingly, the scope of the present invention is intended to embrace all such alternatives, modifications, and variations together and in various possible combinations of various different features of different embodiments combined to form yet additional alternative embodiments, with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term.

Without intent to limit the scope of the disclosure, examples of instruments, apparatus, methods and their related results according to the embodiments of the present disclosure are given. Note that titles or subtitles may be used in the various embodiments for convenience of a reader, which in no way should limit the scope of the disclosure.

Various features and advantages of the disclosure are set forth in the description above, and in part will be obvious from the description, or can be learned by practice of the herein disclosed principles. The features and advantages of the disclosure can be realized and obtained by means of the instruments and combinations particularly pointed out in the appended claims.

What is claimed is:

1. A multilayer insulation comprising:
a first insulation layer;
a second insulation layer;
a third insulation layer;
a first conductive structural spacer structure positioned between the first insulation layer and the second insulation layer, the first conductive structural spacer structure including a metalized outer surface with defined features and geometries to minimize solid thermal conductivity and provide electrical continuity between the first insulation layer and the second insulation layer;
a second conductive structural spacer positioned between the second insulation layer and the third insulation layer, the second conductive structural spacer structure including a metalized outer surface with defined features and geometries to minimize solid thermal conductivity and provide electrical continuity between the second insulation layer and the third insulation layer; and
an electrical connection between the first conductive structural spacer and the second conductive structural spacer providing an electrical path between the first insulation layer, first conductive structural spacer, second insulation layer, second conductive structural spacer and the third insulation layer.

2. The multilayer insulation of claim 1 wherein the geometry of each of the first conductive structural spacer and the second conductive structural spacer define an A/L ratio of $1.36 \times 10^{-4}$ m to reduce conducted heat flux and an electrical resistivity of 0.1 to $2.0\Omega$ to reduce electrical continuity between the first insulation layer and the second insulation layer of the multilayer insulation.

3. The multilayer insulation of claim 1 wherein each of the first conductive structural spacer structure and the second conductive structural spacer are encapsulated with a layer of electrically conductive metal in the range of 350-1500 Angstroms and wherein the electrically conductive metal is Aluminum, Nickel, Silver, Gold, Chromium, or Titanium.

4. The multilayer insulation structure of claim 1 wherein each of the first conductive structural spacer structure and the second conductive structural spacer comprise a low thermal conductivity material.

5. The multilayer insulation structure of claim 4 wherein the low thermal conductivity material is ULTEM, PEEK, LCP or Alumina.

6. The multilayer insulation structure of claim 1 wherein the first conductive structural spacer structure is attached to the first insulation layer and the second conductive structural spacer is attached to the second insulation layer through bonding with an electrically conductive adhesive that provides an electrical ground path through the metalized surface of the structural support spacer to the first insulation layer and the second insulation layer.

7. The multilayer insulation structure of claim 6 wherein multiple stacks of conductive structural support spacers can provide redundant ground paths of the multilayer insulation.

8. The multilayer insulation structure of claim 1 wherein a chassis ground tail extends from at least one of the first insulation layer, the second insulation layer or the third insulation layer, and electrically coupled with the electrical path between the first insulation layer, first conductive structural spacer, second insulation layer, second conductive structural spacer and the third insulation layer.

9. The multilayer insulation of claim 1 further comprising:
an electrically conductive tape on the second insulation layer, the electrically conductive tape extending from a first side of the second insulation layer in electrical contact with the first conductive structural spacer to a second side of the second insulation layer in electrical contact with the second conductive structural spacer, the electrically conductive tape providing the electrical connection between the first conductive structural spacer and the second conductive structural spacer.

10. The multilayer insulation of claim 1 further comprising:
an aperture in the second insulation layer;
a conductor extending through the aperture and in electrical contact with the first conductive structural spacer and the second conductive structural spacer, the conductor providing the electrical connection between the first conductive structural spacer and the second conductive structural spacer.

11. The multilayer insulation of claim 10 wherein the second insulation layer comprises a first outer metalized layer and a second outer metalized layer with a non-conductive polymer layer therebetween, the first conductive structural spacer in contact with the first outer metalized layer and the second conductive structural spacer in contact with the second outer metalized layer, the conductor extending through the aperture providing an electrical connection between the first outer metalized layer and the second outer metalized layer through the non-conductive polymer layer.

12. The multilayer insulation of claim 11 wherein the conductor is a conductive adhesive.

13. The multilayer insulation of claim 1 further comprising
a first plurality of first non-conductive structural spacers positioned between the first insulation layer and the second insulation layer;
a second plurality of second non-conductive structural spacers positioned between the second insulation layer and the third insulation layer, the second plurality of second non-conductive structural spacers aligned with respective first non-conductive spacers to maintain spacing between the first insulation layer and the second insulation layer, and to maintain spacing between the second insulation layer and the third insulation layer, and
wherein the first insulation layer, the second insulation layer and the third insulation are thermally insulated and electrically isolated from one another by the first plurality of first non-conductive structural spacers and the second plurality of second non-conductive structural spacers.

14. The multilayer insulation of claim 13 wherein:
the first non-conductive structural spacer and the second non-conductive structural spacer are axial aligned, the second non-conductive structural spacer electrically coupled to ground, with the combination of the first non-conductive structural spacer, the second non-conductive structural spacer, the electrical connection between the first non-conductive structural spacer and the second non-conductive structural spacer providing an electrostatic grounding path between the third insulation layer, the second insulation layer and the first insulation layer.

15. A multilayer insulation comprising:
a first insulation layer;
a second insulation layer; a first conductive structural spacer structure positioned between the first insulation layer and the second insulation layer, the first conductive structural spacer structure including a metalized outer surface with defined features and geometries to minimize solid thermal conductivity and provide electrical continuity between the first insulation layer and the second insulation layer; a second conductive structural spacer including a metalized outer surface with defined features and geometries to minimize solid thermal conductivity and provide electrical continuity between the second insulation layer and the third insulation layer; and wherein the first conductive support spacer is aligned with a first hole in the first insulation layer, and the second conductive support spacer is aligned with a second hole in the second insulation layer, where each of the first hole and the second hole includes conductive adhesive expressed through the respective holes creating electrical continuity across a dual metalized film or radiant barrier such as PET or Kapton of the respective first insulation layer and second insulation layer.

* * * * *